United States Patent Office 3,246,023
Patented Apr. 12, 1966

3,246,023
ESTER OF AN α-SULFOCARBOXYLIC ACID AND A POLYALKYLENEOXIDE GLYCOL ETHER
Kwan-Ting Shen and Patrick M. Quinlan, St. Louis, Mo., assignors to Petrolite Corporation, Wilmington, Del., a corporation of Delaware
No Drawing. Filed May 3, 1962, Ser. No. 192,092
11 Claims. (Cl. 260—400)

This invention relates to esters of α-sulfo carboxylic acids and a polyalkylene oxide glycol mono ether. These esters may be expressed by the following formula

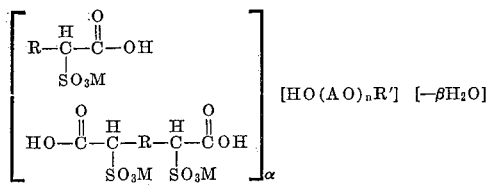

or in the case of the completely esterified ester by the formula

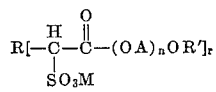

where R is a hydrocarbon radical for example alkyl, alkylene, etc. such as (1) an alkyl radical having at least 6 carbon atoms, such as 6–50 or more, advantageously at least 10 carbon atoms, but preferably 14–16 carbon atoms or (2) an alkylene radical having at least one carbon atom, such as 1–50 or more, advantageously 2–35, but preferably 4–10 carbons; A is a lower alkylene group; $n$ is determined by the number of alkylene oxide units added, for example 1–100 or more, such as 1–50, advantageously 1–20, but preferably 1–10; R' is a hydrocarbon group, for example alkyl, alkenyl, alkinyl, cycloalkyl, aryl, alkaryl, aralkyl, etc.; and $r$ is an integer, for example 1–3, such as 1–2, but preferably 1; M is hydrogen or a salt moiety; α represents the number of moles of sulfo acid esterified; and β represents the moles of water removed on esterification.

The following are non-limiting examples of R': phenyl, diphenyl, naphthyl, cycloalkyl, alkylphenyl, polyalkylphenyl, alkylnaphthyl, polyalkylnaphthyl, alkylcycloalkyl, polyalkylcycloalkyl, alkyldiphenyl, polyalkyldiphenyl, phenalkyl, alkylphenalkyl, polyalkylphenalkyl, etc.; alkyl or alkenyl, for example having from 1–30 or more carbon atoms (straight-chained or branched), but preferably 6–18 carbon atoms, etc.

$(OA)_n$ is derived from any suitable α, β alkylene oxide, for example, alkylene oxides of the formula

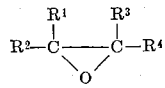

where $R^1$, $R^2$, $R^3$, $R^4$ are hydrogen or a substituted group, such as alkyl, cycloalkyl, aryl, etc., for example ethylene oxide, propylene oxide, butylene oxide, amylene oxide octylene oxide, styrene oxide, methylstyrene oxide, cyclohexene oxide (where $R^1$ and $R^3$ are joined to form a ring), etc.

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

$(OA)_n$ denotes (1) homo units for example—$(OEt)_n$, —$(OPr)_n$—, —$(OBu)_n$—, —$(O\ Octyl)_n$—,

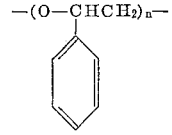

etc., (2) block units,

—$(OEt)_a(OPr)_b$—, —$(OEt)_a(OBu)_b$—
$(OPr)_a(OEt)_b(OPr)_c$, $(OEt)_a(OPr)_b(OBu)_c$

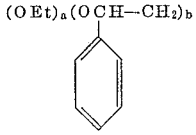

etc. where $a+b+c=n$; (3) hetero units containing random mixtures of more than one oxide $(OEt—OPr)_n$, $(OPr—OBu)_n$, $(OEt—OBu)_n$, wherein the ratio of each oxide to the other is for example 1–99 to 99–1; (4) hetero-homo units for example $(EtO)_a(EtO—PrO)_b$, $(EtO)_a(PrO)_b(EtO—PrO)_c$, $(EtO—PrO)_a(BuO)_b$, etc.

In addition, derivatives of $(OA)_n$ can be derived from an oxetane (e.g. α–γ alkylene oxides) for example those of the formula

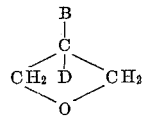

where B and D are hydrogen or a substituted radical, for example alkyl, aryl, cycloalkyl, alkenyl, aralkyl, etc.

In addition, B and D can be substituted such as where the oxetane is derived from pentaerythritol and derivatives thereof. Examples of such oxetanes can be found in the American Chemical Society Monogram "The Pentaerythritols" by Berlow et al. (Reinhold 1958), chapter X. Preferred embodiments of such pentaerythritol-derived oxetanes include those of the formula

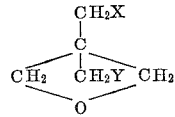

where X and Y are halogen, cyano, hydroxy and alkoxy.

The R moiety which completes the carbon chain of the carboxylic acid from which the α-sulfo carboxylic acid is derived has the meaning described above. These acids may be of animal, vegetable or mineral origin.

Since the products of this invention may be block polymers containing blocks or segments of alkylene oxide units which are added sequentially, oxyalkylation is in essence a stepwise procedure. For the sake of simplicity of presentation, the invention will be illustrated by employing as a base oxyalkylatable compound R'OH and by employing only ethylene, propylene, and butylene oxides with the understanding that other hydrophobe oxides can be used in place of propylene and butylene oxides such as amylene oxide, octylene oxide, styrene oxide, oxetanes, etc. These are shown in the following table.

TABLE I

Step I (1) R'(EtO)$_n$OH
(2) R'(PrO)$_n$OH
(3) R'(BuO)$_n$OH
(4) R'(MO)$_n$OH
(5) R'(PrO—BuO)$_n$OH
MO=mixed EtO—PrO

Step II

Reaction of the Step I product with one of the five oxides or mixtures employed in Step I, which oxide had not been reacted in the immediately preceding step. For example:

(6) R'(EtO)$_n$(PrO)$_m$OH
(7) R'(EtO)$_n$(BuO)$_m$OH
(8) R'(EtO)$_n$(MO)$_m$OH
(9) R'(EtO)$_n$(PrO–BuO)$_m$OH
(10) R'(PrO)$_n$(EtO)$_m$OH
(11) R'(PrO)$_n$(BuO)$_m$OH
(12) R'(PrO)$_n$(MO)$_m$OH
(13) R'(PrO)$_n$(Pro–BuO)$_m$OH
(14) R'(BuO)$_n$(EtO)$_m$OH
(15) R'(BuO)$_n$(PrO)$_m$OH
(16) R'(BuO)$_n$(MO)$_m$OH
(17) R' BuO)$_n$(PrO–BuO)$_m$OH
(18) R'(MO)$_n$(EtO)$_m$OH
(19) R'(MO)$_n$(PrO)$_m$OH
(20) R'(MO)$_n$(BuO)$_m$OH
(21) R'(MO)$_n$(PrO–Buo)$_m$OH
(22) R'(PrO–BuO)$_n$(EtO)$_m$OH
(23) R'(PrO–BuO)$_n$(PrO)$_m$OH
(24) R'(PrO–BuO)$_n$(BuO)$_m$OH
(25) R'(PrO–BuO)$_n$(MO)$_m$OH

Step III

The products of Step II can be reacted with one of the five epoxides or mixture of oxides which had not been reacted in the immediately preceding step, i.e. either EtO, PrO, BuO, MO, or PrO–BuO, with the above exclusion as to the epoxide just reacted. This will be illustrated as follows:

(26) R'(EtO)$_n$(PrO)$_m$(EtO)$_x$H
(27) R'(EtO)$_n$(PrO)$_m$(BuO)$_x$H
(28) R'(EtO)$_n$(PrO)$_m$(MO)$_x$H
(29) R'(EtO)$_n$(PrO)$_m$(PrO–BuO)$_x$OH
(30) R'(EtO)$_n$(BuO)$_m$(EtO)$_x$OH
(31) R'(EtO)$_n$(BuO)$_m$(PrO)$_x$OH
(32) R'(EtO)$_n$(BuO)$_m$(MO)$_x$OH
(33) R'(EtO)$_n$(BuO)$_m$(PrO–BuO)$_x$OH
(34) R'(EtO)$_n$(MO)$_m$(EtO)$_x$OH
(35) R'(EtO)$_n$(MO)$_m$(PrO)$_x$OH
(36) R'(EtO)$_n$(MO)$_m$(BuO)$_x$OH
(37) R'(EtO)$_n$(MO)$_m$(PrO–BuO)$_x$OH
(38) R'(EtO)$_n$(PrO–BuO)$_m$(EtO)$_x$OH
(39) R'(EtO)$_n$(PrO–BuO)$_m$(PrO)$_x$OH
(40) R'(EtO)$_n$(PrO–BuO)$_m$(BuO)$_x$OH
(41) R'(EtO)$_n$(PrO–BuO)$_m$(MO)$_x$OH
(42) R'(PrO)$_n$(EtO)$_m$(PrO)$_x$OH
(43) R'(PrO)$_n$(EtO)$_m$(BuO)$_x$OH
(44) R'(PrO)$_n$(EtO)$_m$(MO)$_x$OH
(45) R'(PrO)$_n$(EtO)$_m$(Pro–BuO)$_x$OH
(46) R'(PrO)$_n$(BuO)$_m$(EtO)$_x$OH
(47) R'(PrO)$_n$(BuO)$_m$(PrO)$_x$OH etc.

Step IV involves the oxyalkylation of the products of Step III. Step V involves the oxyalkylation of Step IV. Further oxyalkylations involve Steps VI–X or higher.

Although the hydroxy compounds described above are oxygen-containing compounds, corresponding compounds can be formed from thiophenols and mercaptans. In addition, sulfur analogues of the alkylene oxides can also be employed. Thus, aryl-SH or alkyl-SH can be oxyalkylated with alkylene oxide, alkylene sulfide, or mixtures of alkylene oxides and alkylene sulfide in a random or block-wise fashion. The following compounds are exemplary:

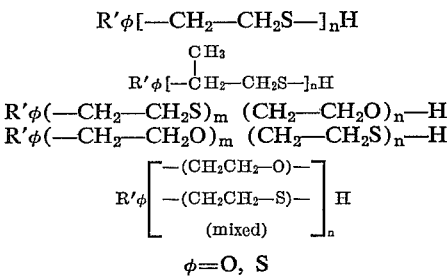

$\phi$=O, S

The above oxyalkylated hydroxy compounds and others within the scope of this invention are esterified in the conventional manner, for example, by heat alone, heat and reduced pressure, heat in combination with an azeotroping agent, etc., until the desired amount of water is removed so as to form an ester.

The letter "R" indicates that the sulfo acid may be mono or polycarboxylic acid. For example, where the compound is a dicarboxylic acid it has the following formula:

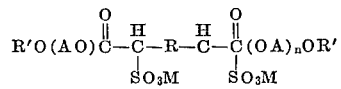

When less than fully esterified it has the formula:

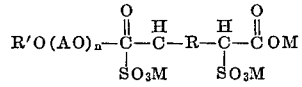

M designates H or the cationic moiety of sulfonate salt. The salts of the sulpho-carboxylic acid esters which may be produced by this invention are many and varied. In general, salts of most inorganic and organic bases may be prepared. Among the inorganic salts are the alkali metal and alkaline earth salts, such as the sodium, potassium, calcium, magnesium, etc. salts as well as the salts of heavy metals. Ammonium and substituted ammonium or organic nitrogenous base salts may also be prepared. Included within this class are, for example, the salts of alcohol amines, including monoethanolamine, diethanolamine, triethanolamine, propanolamines, butanolamines, pentanolamines, glycerolamines, dimethyl monoethanolamine, diethyl monoethanolamine, dibutyl monoethanolamine, diethanol ethyl amine, cyclohexyl ethanolamine, alkylol polyamines such as alkylol derivatives of ethylene diamine, mono-methyl mono-ethanolamine, diethyl monoethanolamine, 1-amino-2, 3-propanediol, 1, 2-diamino-propanol; alkylamines such as butylamine, diethylamine, ethylene diamine, diethylene triamine, triethylene tetra-amine, mono-methyl ethylene diamine, monoethyl diethylene tetra-amine, hydrazine and substituted hydrazines, aromatic and heterocyclic bases and cyclic nitrogenous substances such as pyridine, quinaldine, piperidine, methylpyridine, imidazolines, and homologues and derivatives thereof, and, in general, primary, secondary and tertiary amines substituted or not with other radicals such as hydroxy, alkyl, aryl, cycloalkyl groups and the like; quarternary ammonium bases or hydroxides such as tetramethyl ammonium hydroxide, tetraethyl ammonium hydroxide, quarternary ammonium bases with dissimilar alkyl radicals such as methyltriethyl ammonium hydroxide, propyl-trimethyl ammonium hydroxide, mixtures of any two or more thereof, and the like. It will be understood that these organic nitrogenous bases may be employed in pure, impure or commercial form such as, for example, commercial triethanolamine which contains minor proportions of mono- and di-ethanolamine. The tabulation of specific salts given hereinabove is by no means meant to be exhaustive, but it affords to those skilled in the art more than an adequate exemplification of the practice of this invention.

In certain fields of utility other salts can also be employed. For example, calcium, barium, zinc, strontium, aluminum, chromium, nickel and other polyvalent metal salts which are soluble in hydrocarbons may be used as oil soluble detergents. They are useful, for example, in turbine oils and in lube oils of the type used in the crank cases of internal combustion engines. For this purpose they are ordinarily added to the oils in amounts of about 0.1% to about 5% by weight.

In addition to their utility as wetting agents and detergents certain salts may be employed for special purposes. For example, copper, cadmium and mercury salts may be applied as mildew-proofing agents, for example in cellulosic textiles. Amine and quaternary ammonium salts may be applied as moth proofing agents for woolens.

Although various meanings have been assigned to the symbols in the above formulae, the best combinations thereof will depend on the particular application to which the composition is applied. For example, R and R' can be selected so as to yield the desired oil or water solubility, or the type, amount and proportions of $(OA)_n$ can vary the solubility which has already been imparted by R and R'. In certain systems it may be desirable to employ the composition as a free sulfonic acid while in others it may be desirable to employ it in the form of its salt. Therefore, specific composition variations will depend on the particular system in which it is employed.

It should also be understood that where a polyvalent cation is employed for M, for example as where M is calcium, the compound has the following structure

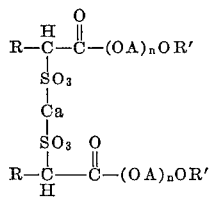

These compounds may be conveniently expressed by having $M = \frac{1}{2}Ca$.

The following examples are presented by way of illustration and not of limitation.

EXAMPLE 5

Into a 500 ml. resin pot fitted with a stirrer, Dean-Stark water trap, and reflux condenser was introduced a mixture containing 181.5 g. (0.5 mole) of α-sulfostearic acid, 229 g. (0.5 mole) of an oxyethylated p-t-butyl phenol (7 moles of ethylene oxide), and 150 ml. of benzene. The mixture was stirred and heated at reflux temperature until the theoretical amount of water of esterification was removed (about 9 ml.). After the reaction was completed (as checked by an infrared spectra) the benzene was removed by heating the mixture in vacuo. The product is

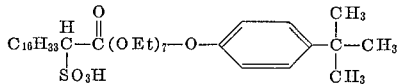

EXAMPLE 12

Into a 500 ml. resin pot fitted with a stirrer, Dean-Stark water trap, and reflux condenser was introduced a mixture containing 181.5 g. (0.5 mole) of α-sulfostearic acid, 162 g. (0.5 mole) of an oxypropylated p-t-butyl phenol (3 moles of propylene oxide), and 150 ml. of benzene. The mixture was stirred and heated at reflux temperature until the theoretical amount of water of esterification was removed (9 ml.). After the reaction was completed (as checked by an infrared spectra), the benzene was removed by heating the mixture in vacuo. The product is

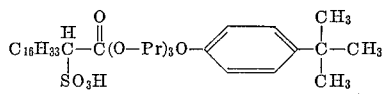

EXAMPLE 8

Into a 500 ml. resin pot fitted with a stirrer, Dean-Stark water trap, and reflux condenser was introduced a mixture containing 181.5 g. (0.5 mole) of α-sulfostearic acid, 159 g. (0.5 mole) of oxyethylated dodecyl alcohol (3 moles of ethylene oxide), and 150 ml. of benzene. The mixture was stirred and heated at reflux temperature until the theoretical amount of water of esterification was removed (about 9 ml.). After the reaction was completed (as checked by infrared spectra) the benzene was removed by heating the mixture in vacuo. The product is

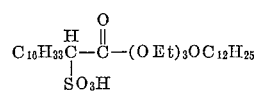

EXAMPLE 33

Into a 500 ml. resin pot fitted with a stirrer, Dean-Stark water trap, and reflux condenser was introduced a mixture containing 170 g. (0.5 mole) of α-sulfopalmitic acid, 145 g. (.05 mole) of oxyethylated dodecyl mercaptan (2 moles of ethylene oxide) and 150 ml. of benzene. The mixture was stirred and heated at reflux temperature until the theoretical amount of water of esterification was removed (about 9 ml.). After the reaction was completed (as checked by infrared spectra) the benzene was removed by heating the mixture in vacuo. The product is

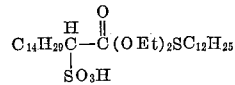

EXAMPLE 23

Into a 500 ml. resin pot fitted with a stirrer, Dean-Stark water trap, and reflux condenser was introduced a mixture containing a 146 g. (0.5 mole) of the reaction product of 3,3 dimethyl oxetane and p-octyl phenol (1:1 molar ratio), 170 g. (0.5 mole) of α-sulfopalmitic acid in 150 ml. of benzene. The mixture was stirred and heated at reflux temperature until the theoretical amount of water of esterification was removed (about 9 ml.). After the reaction was completed (as checked by infrared spectra) the benzene was removed by heating the mixture in vacuo. The product is

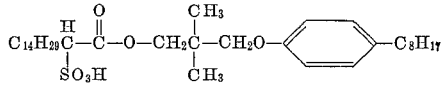

The examples presented in Table II are similarly prepared by esterifying the oxyalkylated hydroxy compounds or sulfur analogues thereof with the α-sulfo acid. Therefore, to save repetitive details they are presented in table form. The salts are prepared in the conventional manner, with some heating if necessary, by mixing the corresponding acids and the desired bases.

The dicarboxylic sulfo acids of Table III are similarly prepared except that 2 moles of hydroxy compound are added for each mole of dicarboxylic acid.

Where more than one alkylene oxide is added, the order of addition corresponds to the order as written in the table. For example, Example 27 which states $$\begin{Bmatrix} EtO\ 10 \\ PrO\ 5 \end{Bmatrix}$$

corresponds to

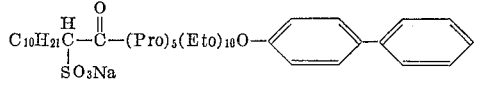

TABLE II $$R-\overset{H}{\underset{SO_3M}{C}}-\overset{O}{\overset{\|}{C}}-(OA)_nOR'$$

| Ex. | R | Source of OA | n | R' | M |
|---|---|---|---|---|---|
| 1 | $C_{16}H_{33}$ | EtO | 3 | p-Nonyl phenyl | H |
| 2 | $C_{16}H_{33}$ | EtO | 10 | do | H |
| 3 | $C_{16}H_{33}$ | EtO | 3 | p-Methyl phenyl | H |
| 4 | $C_{16}H_{33}$ | EtO | 8 | do | Na |
| 5 | $C_{16}H_{33}$ | EtO | 7 | p-Tertiary butyl phenyl | H |
| 6 | $C_{16}H_{33}$ | EtO | 5 | do | Zn |
| 7 | $C_{16}H_{33}$ | EtO | 6 | p-Octyl phenyl | H |
| 8 | $C_{16}H_{33}$ | EtO | 3 | Dodecyl | H |
| 9 | $C_{16}H_{33}$ | EtO | 8 | Dinonyl phenyl | $NH_4$ |
| 10 | $C_{16}H_{33}$ | EtO | 40 | p-Nonyl phenyl | $NH_4$ |
| 11 | $C_{16}H_{33}$ | PrO | 3 | p-methyl phenyl | H |
| 12 | $C_{16}H_{33}$ | PrO | 3 | p-tertiary butyl phenyl | H |
| 13 | $C_{16}H_{33}$ | PrO | 4 | p-Octyl phenyl | Ba |
| 14 | $C_{16}H_{33}$ | PrO | 6 | p-Nonyl phenyl | Morpholinium |
| 15 | $C_{16}H_{33}$ | PrO | 8 | p-Dodecyl phenyl | Na |
| 16 | $C_{16}H_{33}$ | PrO | 7 | p-Tertiary Butyl phenyl | $NH_4$ |
| 17 | $C_{14}H_{29}$ | BuO | 3 | do | H |
| 18 | $C_{14}H_{29}$ | BuO | 4 | p-Methyl phenyl | $H_2N+(CH_2CH_2OH)_3$ |
| 19 | $C_{14}H_{29}$ | EtO | 3 | Dodecyl | H |
| 20 | $C_{14}H_{29}$ | EtO | 10 | Tetradecyl | Pyridinium |
| 21 | $C_{14}H_{29}$ | PrO | 8 | Octyl | Na |
| 22 | $C_{14}H_{29}$ | PrO | 2 | Dodecyl | Na |
| 23 | $C_{14}H_{29}$ | 3,3-dimethyl oxetane | 1 | p-Octyl phenyl | H |
| 24 | $C_{16}H_{33}$ | do | 2 | Decyl | H |
| 25 | $C_{16}H_{33}$ | PrO | 5 | Cyclohexyl | Na |
| 26 | $C_{16}H_{33}$ | EtO | 8 | Dinonyl cyclohexyl | Na |
| 27 | $C_{10}H_{21}$ | {EtO, PrO} | 10, 5 | p-Phenyl phenyl | Na |
| 28 | $C_6H_{13}$ | {PrO, EtO} | 15, 5 | Dinonyl phenyl | $\overset{\oplus}{NH_3}(CH_2CH_2\overset{H}{N})_3H$ |
| 29 | $C_{16}H_{33}$ | {EtO, 3,3-dichloro methyl oxetane} | 10, 3 | p-Cyclohexyl | $C_{12}H_{25}-\overset{H}{\underset{}{N}}-CH_2CH_2CH_2\overset{\oplus}{NH_3}$ |
| 30 | $C_{14}H_{29}$ | EtO | 23 | p-Butyl phenyl (derived from the thiophenol), above formula is—$(OA)_nSR'$. | Na |
| 31 | $C_{16}H_{33}$ | EtO | 28 | p-Terrtiary butyl (derived from thiophenol), above formula is—$(OA)_nSR'$. | Na |
| 32 | $C_{16}H_{33}$ | EtO | 15 | Octyl (derived from the mercaptan), above formula is $(OA)_nSR'$. | $NH_4$ |
| 33 | $C_{14}H_{29}$ | EtO | 2 | Dodecyl (derived from mercaptan), above formula is —$(OA)_nSR'$. | H |
| 34 | $C_{10}H_{21}$ | EtO-PrO (1:1 mol. ratio) | 8 | Octadecyl (derived from the mercaptan), above formula is—$(OA)_nS-R'$. | $NH_4$ |
| 35 | $C_{16}H_{33}$ | EtO | 4 | 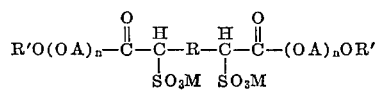 derived from— 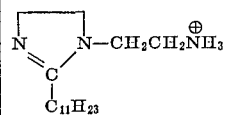 | Na / OH |

TABLE III $$R'O(OA)_n-\overset{O}{\overset{\|}{C}}-\overset{H}{\underset{SO_3M}{C}}-R-\overset{H}{\underset{SO_3M}{C}}-\overset{O}{\overset{\|}{C}}-(OA)_nOR'$$

| Ex. | R | Source of OA | n | R' | M | Source Dicarboxylic Acid for R |
|---|---|---|---|---|---|---|
| 1 | Dimer acid R=32 carbons | EtO | 25 | p-Tert. butyl phenyl | $\underset{\underset{C_{11}H_{23}}{\|}}{\underset{C}{\overset{N\diagdown}{\underset{\diagup}{\phantom{x}}}\overset{\diagup}{\underset{\diagdown}{\phantom{x}}}N-CH_2CH_2\overset{\oplus}{NH_3}}}$ | Dilinoleic acid. |
| 2 | $-(CH_2)_4-$ | PrO | 16 | p-Nonyl phenyl | Mg | Adipic. |
| 3 | $-(CH_2)_7-$ | EtO-PrO, 1:1 mol ratio | 20 | p-Methyl phenyl | Ba | Azelaic. |
| 4 | $-(CH_2)_8-$ | EtO-PrO, 2:1 mol ratio | 30 | p-Tert.butyl phenyl | $NH_4$ | Sebacic. |

USES

The products obtained by this process are valuable anionic surface active agents and have many varied commercial uses. The most conspicuous property of these products is their great activity at surfaces and interfaces which promotes their use in a large field of the technical arts. For instance, they can be used as wetting, frothing, or washing agents in the treating and processing of textiles; for converting liquid or solid substances which per se are insoluble in water (such as hydrocarbons, higher alcohols, oils, fats, waxes, and resins) into creamy emulsions, clear solutions or fine stable dispersions; for dyeing; for the pasting of dyestuffs; for fulling, sizing, impregnating and bleaching treatments; as cleansing agents in hard water; in tanning and mordanting processes; for dyeing acetate with insoluble dyestuffs; for the preparation of dyestuffs in finely divided form; for dispersible dye powders; for producing foam for fire extinguishers; as a means for improving the absorptive power of fibrous bodies; and as an aid in softening hides and skins.

In addition, these products are valuable emulsifiers for insecticidal compositions and agricultural sprays such as DDT, 2,4-D, toxaphene, chlordane, dormant or mineral oil sprays, nicotine sulfate, methoxychlor, etc. and are effective dispersants for pesticidal powders, such as those containing the above toxicants. They are also valuable emulsifiers for herbicides, etc.

These products are also valuable for use as additives to petroleum products, such as fuel oils, lubricating oils, greases, and as additives to the water or brine used for oil recovery from oil-bearing strata by flooding techniques.

Other valuable uses are in metal cleaning compositions; dry cleaning compositions; additives for rubber latices; foam inhibitors for synthetic rubber latex emulsions; froth flotation agents; additives for road building materials; as air entraining agents for concrete or cement; additives to asphalt compositions; plasticizers and modifiers for vinyl plastics, alkyl resins, phenol-formaldehyde resins and other types of polymeric-type plastic materials; for incorporation into adhesives, paints, linoleum, for use in bonding agents used in various insulating and building materials; as refining aids in wood digesters to prepare pulp; as additives to pulp slurries in beating operations to prevent foaming and also to aid the beating operation in paper-making; and as aids in the preparation of viscose dope.

The products are also useful as emulsifiers for emulsion polymerization, as mercertizing assistants, wetting agents, rewetting agents, dispersing agents, detergents, penetrating agents, softening agents, lime soaps dispersants, dishwashing agents, anti-static agents, disinfectants, insecticides, moth-proofing agents, bactericides, fungicides and biocides. They are valuable as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

The products are especially useful alone or in combination with other demulsifiers in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rust inhibitors, in the protection of metals especially ferrous metals, in acid pickling baths, in acid cleaning compositions, and in electroplating baths. Other valuable uses are as solvents or in solvent compositions, as cleaning agents for paint brushes, as additives for paints, lacquers, and varnishes; as lubricants, as greases and stuffing agents.

The products may be employed in the preparation of skin creams, lotions, salves and other cosmetic preparations such as home hair-wave sets, shaving creams, shampoos, toothpastes, etc.

They may be used as aids in conditioning of soil; as aids in the grinding, milling or cutting of metals either in aqueous solution, emulsions or in oils; as aids in the fixing of dyes to leather and natural or synthetic fibers; as aids in level dyeing of fibers; as aids in stimulating plant growth; as an additive to cement to improve the strength of the resulting concrete or to improve its hardening time or its resistance to freezing and thawing or scaling; and as curing aids and penetrants for use in fertilizer.

Having thus described our invention what we claim as new and desire to obtain by Letters Patent is:

1. A carboxylic ester of (1) an α-sulfocarboxylic acid and (2) a polyalkylene oxide glycol monoether where the α-sulfo carboxylic acid is

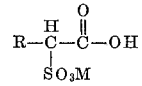

and the polyalkylene oxide glycol monoether is $H(OA)_{1-100}XR'$, where R is an alkyl group having 6–50 carbon atoms, R' is the hydrocarbon-containing moiety of said polyalkylene oxide glycol monoether, M is selected from the group consisting of hydrogen and a salt moiety, OA is an oxyalkylene group, and X is selected from the group, consisting of oxygen and sulfur.

2. An ester of the formula

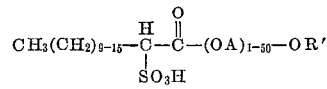

where OA is an oxyalkylene group, M is selected from the group consisting of hydrogen and a cation, and R' is a hydrocarbon group having 1–30 carbon atoms.

3. An ester of the formula

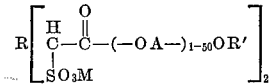

where A represents a lower alkylene group, R is an alkylene group having 1–50 carbon atoms and M is selected from the group consisting of hydrogen and a salt moiety and R' is a hydrocarbon group having 1–30 carbons.

4. An ester of the formula

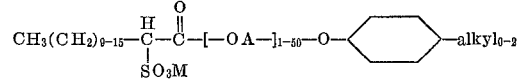

where A is a lower alkylene group, M is selected from the group consisting of hydrogen and a salt moiety.

5. An ester of the formula

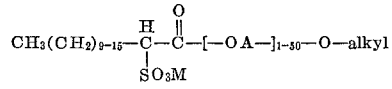

where A is a lower alkylene group and M is selected from the group consisting of hydrogen and a salt moiety.

6. An ester of the formula

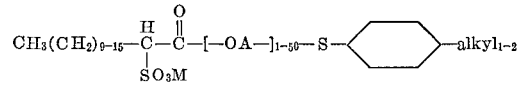

where A is a lower alkylene group and M is selected from the group consisting of hydrogen and a salt moiety.

7. An ester of the formula

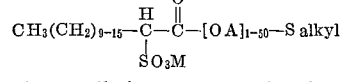

where A is a lower alkylene group and M is selected from the group consisting of hydrogen and a salt moiety.

8. An ester of an α-sulfo carboxylic acid of the formula

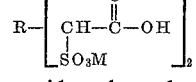

and a polyalkyleneoxide ether glycol of the formula $H(OA)_{1-100}XR'$, where R is an alkylene group having 1–50 carbon atoms, R' is a hydrocarbon group having 1–30 carbon atoms, M is selected from the group consisting of hydrogen and a salt moiety, AO represents an oxyalkylene group and X is selected from the group consisting of oxygen and sulfur.

9. An ester of claim 8 having the formula

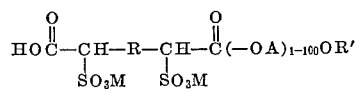

10. An ester of claim 8 having the formula

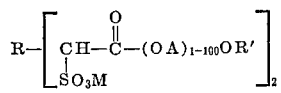

11. An ester of the formula

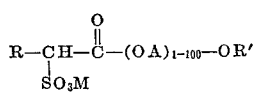

where R is an alkyl group having 6–50 carbon atoms, M is selected from the group consisting of hydrogen and a salt moiety, OA represents an oxyalkylene group and R′ is a hydrocarbon group having from 1–30 carbon atoms.

References Cited by the Examiner

UNITED STATES PATENTS

| | | | |
|---|---|---|---|
| 2,460,968 | 2/1949 | Bert et al. | 260—400 |
| 2,510,008 | 5/1950 | De Groote et al. | 260—481 |
| 2,549,435 | 4/1951 | De Groote et al. | 260—481 |
| 2,602,056 | 7/1952 | De Groote et al. | 260—481 |
| 2,679,529 | 5/1954 | De Groote et al. | 260—481 |
| 2,800,500 | 7/1957 | Matuszak et al. | 260—399 |

CHARLES B. PARKER, *Primary Examiner.*

DANIEL D. HORWITZ, *Examiner.*

ANTON H. SUTTO, *Assistant Examiner.*